Sept. 19, 1967        W. M. MARTIN        3,342,090
NUT GRIPPING TOOLS
Filed Sept. 7, 1966
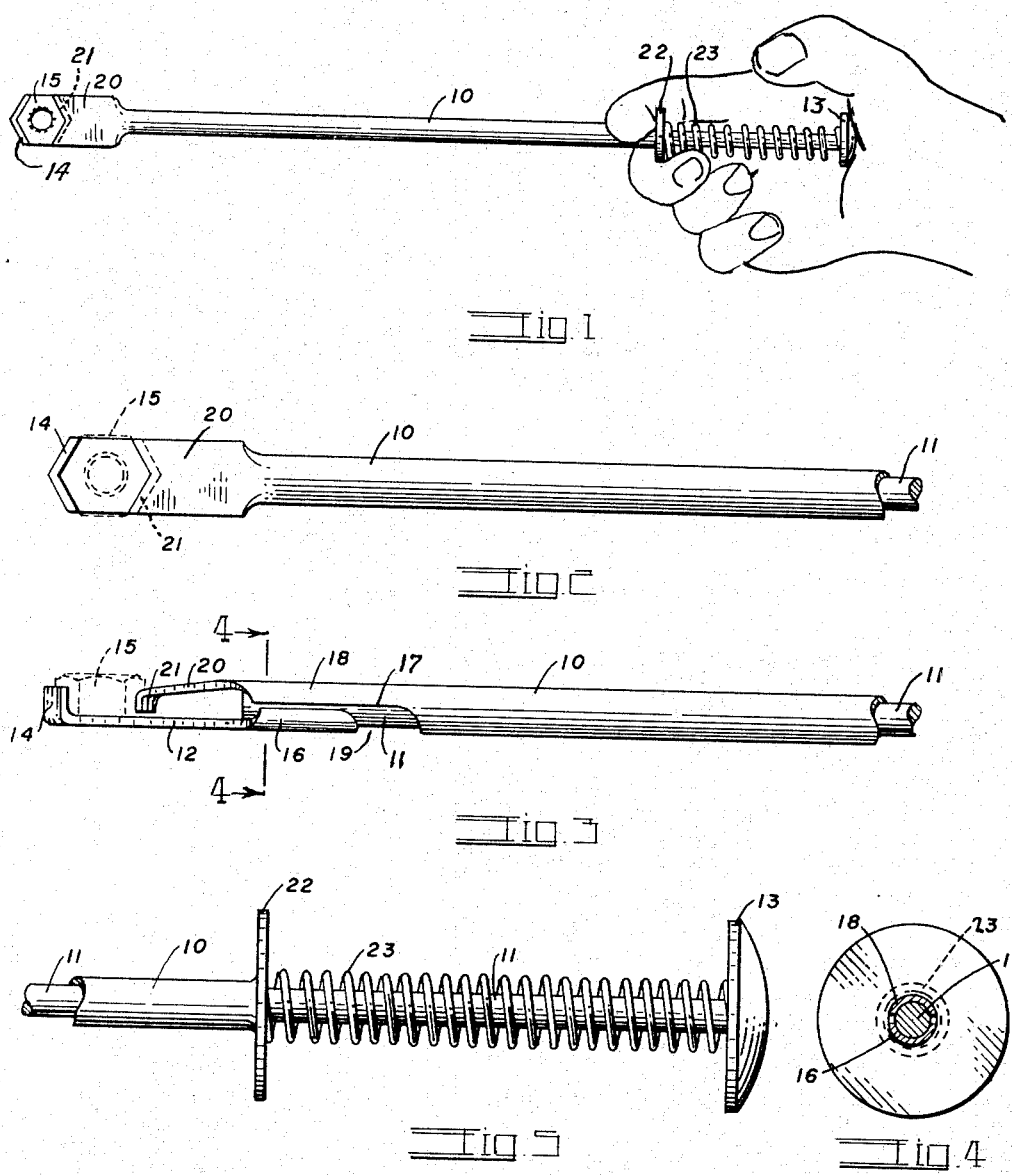
INVENTOR.
Wilfred M. Martin
BY
*[signature]*
ATTORNEY

United States Patent Office 3,342,090
Patented Sept. 19, 1967

3,342,090
NUT GRIPPING TOOLS
Wilfred M. Martin, Denver, Colo., assignor to Clark-Feather Mfg. Co., Fort Morgan, Colo., a corporation of Colorado
Filed Sept. 7, 1966, Ser. No. 577,734
1 Claim. (Cl. 81—345)

ABSTRACT OF THE DISCLOSURE

An elongated handle tube with a spring-loaded, longitudinally slidable rod therein, the forward extremity of said rod carrying a flat first plate with an upturned terminal flange and the forward extremity of said tube carrying a flat second plate in substantially parallel relation to said first plate, said second plate having a downturned terminal flange extending into proximity with said first plate so that a nut resting on said first plate will be gripped between the two flanges when said rod is moved rearwardly in said tube.

---

This invention relates to a tool for positioning and holding a threaded nut while a bolt is being inserted and threaded into the nut. In the assembly of many bolt-secured appliances it is exceedingly difficult and at times impossible to position and hold a nut by hand, due to lack of space in the assembly, while inserting and tightening a bolt therein.

The principal object of this invention is to provide a simple, slender, lightweight tool into which a nut may be quickly and securely interfitted so that the nut can be easily and accurately inserted into and properly positioned in complicated and crowded assemblies with one hand leaving the other hand free to insert and tighten a bolt in the positioned nut.

A further object is to so construct the tool that the nut holding portion of the tool will require no more access space in an assembly than the nut itself so that if there is room available for the nut there will be room available for use of the holding tool.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 illustrates the appearance of the tool when in use;

FIG. 2 is an enlarged, fragmentary, top plan view of the forward extremity of the improved tool with a conventional hexagon nut shown therein in broken line;

FIG. 3 is a similarly enlarged side view of the extremity of FIG. 2;

FIG. 4 is a cross sectional view taken on the line 4—4, FIG. 3; and

FIG. 5 is a similarly enlarged fragmentary side elevational view of the rear extremity of the tool.

The tool comprises a straight elongated handle tube 10 in which a reciprocatable tension rod 11 is closely and slidably mounted. An elongated nut rest plate 12 is fixedly mounted on and projects forwardly from the forward extremity of the rod and a palm-rest button 13 is fixedly mounted on the rear extremity of the rod 11.

The forward extremity of the rest plate 12 is turned upwardly to form a V-shaped terminal nut-retaining flange 14 the two side portions of which are positioned at an angle of 120° to each other so that a conventional hex nut may fit thereagainst as shown in broken line in FIGS. 2 and 3. The sides of the rear extremity of the rest plate 12 are turned upwardly as shown at 16 to form a semi-cylindrical socket in which the forward extremity of the rod 11 is secured in any desired manner such as by soldering, brazing or welding.

The handle tube 10 is relatively shorter then the rod 11 and projects forwardly and rearwardly therefrom. The bottom half of the forward extremity of the tube 10 is cut away, as indicated at 17, to leave a semi-cylindrical cap portion 18 in position over the upturned sides 16 and to leave a longitudinal space 19 for rearward movement of the sides 16.

The forward extremity of the cap portion 18 is flattened to form an elongated top plate 20 positioned over the nut-rest plate 12. The forward extremity of the top plate 20 is turned downwardly to form a V-shaped vise jaw 21 the sides of which are contoured similarly to the nut retaining flange 14 so as to fit against a pointed edge of the nut 15.

A finger disc 22 is affixed on the rear extremity of the handle tube 10 in spaced relation to the button 13 and a cylindrical, helical compression spring 23 surrounds the rod 11 and is compressed between the disc 22 and the button 13 so as to constantly urge the vise jaw 21 toward the retaining flange 14 so as to grip the nut 15 when the latter is resting on the rest plate 12.

It is believed the use of the tool will be apparent from the above. Briefly, the rear extremity of the tool is gripped in the hand, as shown in FIG. 1, with the button 13 resting in the palm and the disc 22 gripped by the fingers. The hand is now contracted so as to compress the spring 23 and separate the vise jaw 21 from the flange 14. The nut is now positioned on the rest plate 12 and the hand pressure is released to allow the nut to be gripped by the expansion of the spring.

The nut is now firmly held in position on the rest plate 12 and can be readily placed and held in the desired position in a close complicated assembly to receive the extremity of the corresponding bolt. As the bolt is tightened, the nut will frictionally engage its eventual seat and be held stationary while the bolt is tightened to its final position. The tool can then be released from the nut by simply contracting the hand.

The disc 22 can be moved rearwardly against the bias of the spring 23 to accommodate nuts of any desired size, limited only by length of the nut rest plate 12. The 120° flare of the flange 14 and the jaws 21 will fit to and accommodate all hex nuts. The tool does not extend laterally beyond the nut so that the latter can be inserted through a space of only sufficient width to accommodate the nut. The vise jaw 21 travels sufficiently close to the rest plate 12 to prevent rotation of the handle tube on the rod 11.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

On a nut gripping tool of the type having an elongated handle tube with a spring-loaded tension rod longitudinally slidable therein, means for supporting and gripping a nut in consequence of relative longitudinal movements of said tube and rod comprising:

(a) a flat, axially elongated nut rest plate mounted on and extending forwardly from said rod in a plane below and substantially parallel to the axis of said rod;

(b) a unitary, upturned nut-retaining flange formed on the forward extremity of said rest plate;

(c) a flat, axially elongated top plate unitarily formed on said tube and extending forwardly over, and in substantially parallel spaced relation therewith; and (d) a unitary, downturned nut-gripping flange formed on the forward extremity of said top plate extending downwardly into close proximity with said rest plate to prevent close proximity with said rest plate to prevent relative rotation of said rod in said tube and to allow a nut to be rested on said rest plate and forced forwardly against said upturned flange by said downturned flange when said rod is moved forwardly in said tube.

References Cited
UNITED STATES PATENTS

| | | | |
|---|---|---|---|
| 1,503,898 | 8/1924 | Hott. | |
| 1,697,764 | 1/1929 | Heinz | 81—125 X |
| 2,320,967 | 6/1943 | Dunkelberger | 81—125 X |
| 2,357,595 | 9/1944 | McPherson | 81—125 |
| 2,496,762 | 2/1950 | Weyrauch | 81—125 X |
| 2,625,848 | 1/1953 | Davies et al. | 81—345 |
| 2,694,330 | 11/1954 | Davies et al. | 81—345 |

OTHELL M. SIMPSON, *Primary Examiner.*

G. WEIDENFELD, *Assistant Examiner.*